US008011622B1

(12) United States Patent
Guthrie

(10) Patent No.: US 8,011,622 B1
(45) Date of Patent: Sep. 6, 2011

(54) POURING DEVICE

(76) Inventor: Wayne Guthrie, Lafayette, IN (US)

( * ) Notice: Subject to any disclaimer, the term of this patent is extended or adjusted under 35 U.S.C. 154(b) by 342 days.

(21) Appl. No.: 12/466,342

(22) Filed: May 14, 2009

(51) Int. Cl.
*A47F 5/12* (2006.01)

(52) U.S. Cl. ......... 248/139; 248/143; 224/164; 414/403

(58) Field of Classification Search .................. 248/133, 248/136, 137, 138, 139, 140, 141, 142, 143; 224/164, 166; 414/403, 404, 425
See application file for complete search history.

(56) References Cited

U.S. PATENT DOCUMENTS

| | | | | |
|---|---|---|---|---|
| 711,339 | A * | 10/1902 | Park | 248/141 |
| 929,325 | A | 7/1909 | Phinny | |
| 996,658 | A | 7/1911 | Minor | |
| 1,705,580 | A | 3/1929 | Marburger | |
| 1,742,041 | A * | 12/1929 | Mangold | 248/141 |
| 1,791,005 | A | 2/1931 | Shepard | |
| 2,605,071 | A | 7/1952 | Trepte | |
| 2,708,558 | A * | 5/1955 | Pedersen | 248/141 |
| 2,813,693 | A * | 11/1957 | Puddicombe et al. | 248/141 |
| 3,236,483 | A * | 2/1966 | House | 248/140 |
| D253,202 | S | 10/1979 | Grigsby, Sr. | |
| 4,193,161 | A * | 3/1980 | Scott | 15/352 |
| 5,393,190 | A | 2/1995 | Vickary | |
| 5,527,009 | A * | 6/1996 | Allen | 248/311.3 |
| 5,582,503 | A | 12/1996 | Sandoval | |
| 5,755,816 | A | 5/1998 | Schirmer et al. | |
| 7,344,112 | B2 * | 3/2008 | Nice | 248/125.1 |
| 2005/0029298 | A1 * | 2/2005 | Sun | 222/166 |
| 2007/0059151 | A1 | 3/2007 | Hager | |

* cited by examiner

*Primary Examiner* — Terrell McKinnon
*Assistant Examiner* — Steven Marsh

(57) ABSTRACT

A pouring device comprising a generally flat base for supporting a bucket; two support bars to which the base is perpendicularly attached; a bucket bar curved outwardly from and attached to the support bars above the base; two support legs, wherein a first support bar is pivotally attached to a first support leg and a second support bar is pivotally attached to a second support leg; a foot attached to each of the support legs for stabilizing the support legs in a vertical position; a pivot handle extending upwardly from a support bar for allowing the pivoting of the base; and a stop plate attached to a support bar opposite the first bucket bar and extending outwardly past a leg support, wherein the stop plate functions to prevent the base from pivoting in a second direction.

5 Claims, 4 Drawing Sheets

POURING DEVICE

FIELD OF THE INVENTION

The present invention is directed to a device for facilitating pouring liquids from large buckets. More particularly, the device comprises a base that a user can manually pivot or tilt so as to pour the liquid from the bucket.

BACKGROUND OF THE INVENTION

Pouring the contents of a bucket (e.g., liquid, paint) into one or more other containers can be time consuming and physically challenging. The present invention features a pouring device for facilitating the pouring of contents into other containers. The pouring device allows a user to pivot a base on which the bucket is placed via a handle. The base is oriented at a certain height above the ground surface so a user does not have to hold up the bucket him/herself.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
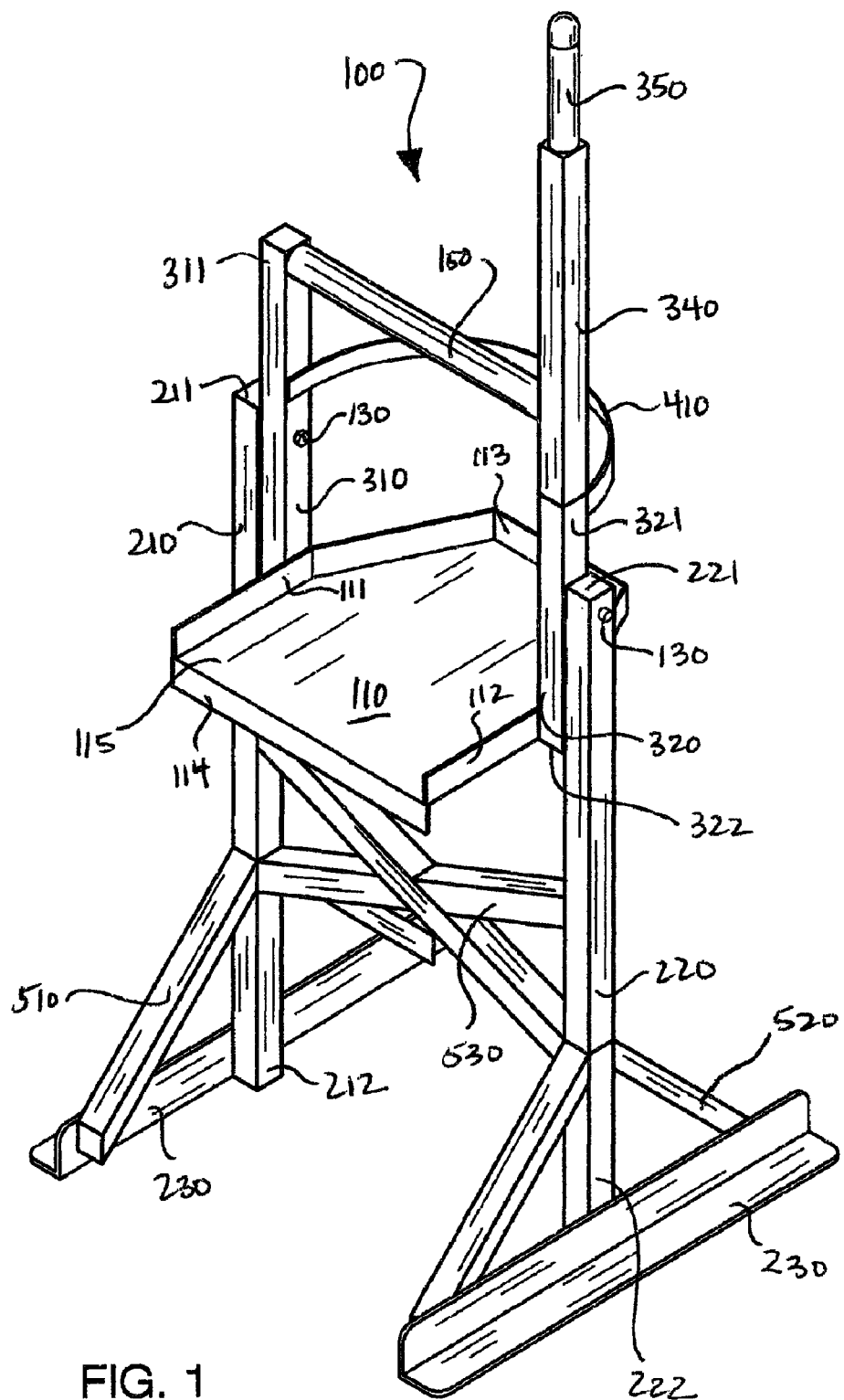
FIG. 1 is a perspective view of the pouring device of the present invention.
Figure 2:
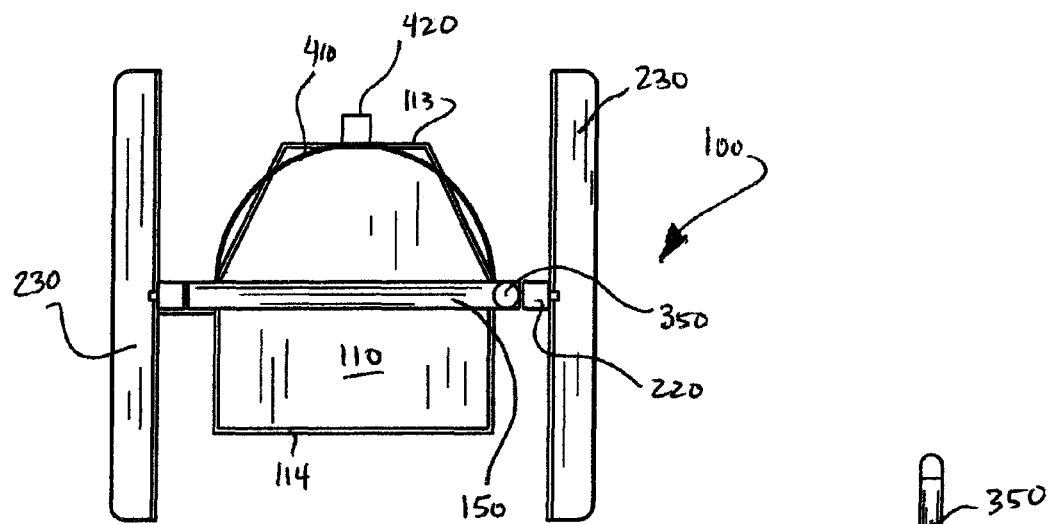
FIG. 2 is a top view of the pouring device of the present invention.
Figure 3:
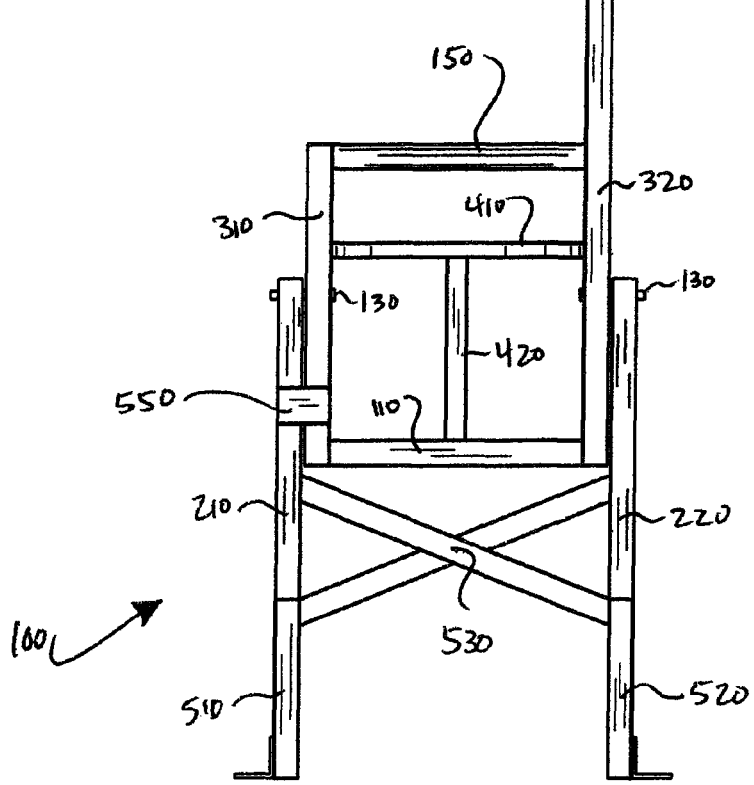
FIG. 3 is a front view of the pouring device of the present invention.
Figure 4:
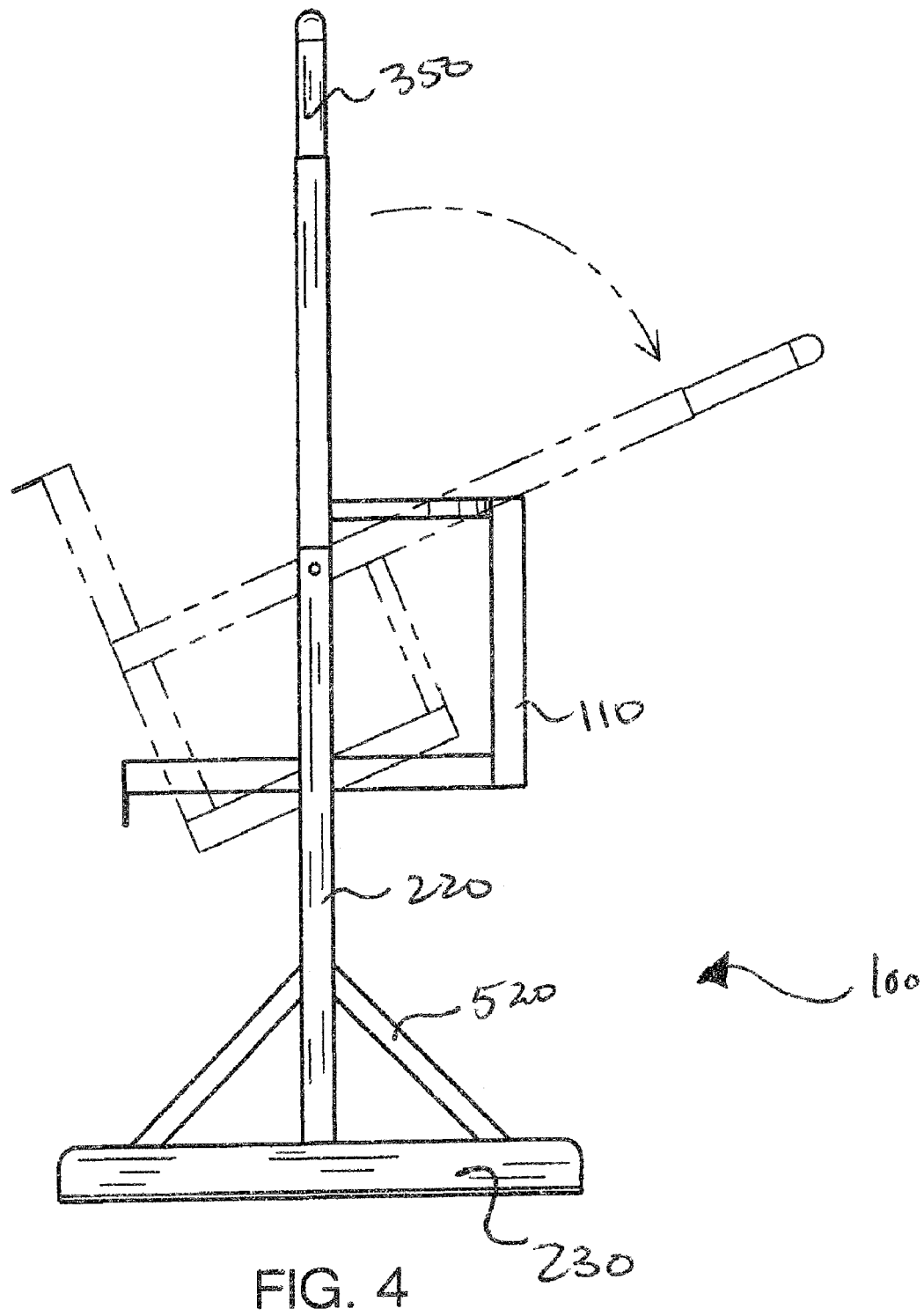
FIG. 4 is a side view of the pouring device of the present invention.
Figure 5:
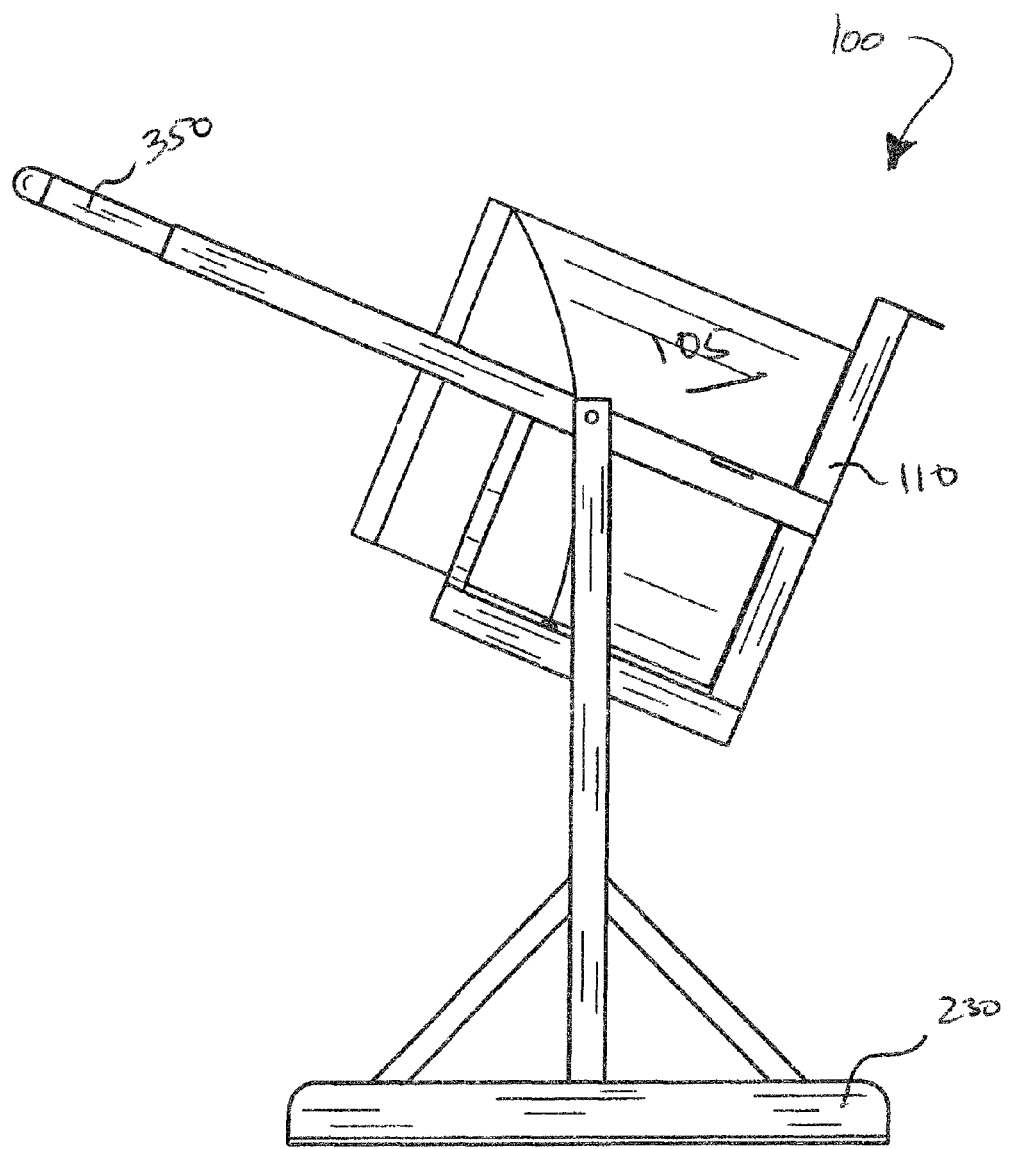
FIG. 5 is a side view of the pouring device of the present invention.

The following is a listing of numbers corresponding to a particular element refer to herein:
100 pivot device
105 bucket
110 base
111 first side edge of base
112 second side edge of base
113 front edge of base
114 back edge of base
115 top surface of base
116 bottom surface of base
130 pivot pin
150 carrying handle
210 first support leg
211 first end of first support leg
212 second end of first support leg
220 second support leg
221 first end of second support leg
222 second end of second support leg
230 foot
310 first support bar
311 first end of first support bar
312 second end of first support bar
320 second support bar
321 first end of second support bar
322 second end of second support bar
340 pivot handle connecting bar
350 pivot handle
410 first bucket support bar
420 second bucket support bar
510 first leg brace
520 second leg brace
530 cross brace
550 stop plate Referring now to FIGS. 1-5, the present invention features a pouring device 100 for facilitating pouring a liquid from a bucket 105 (e.g., a 5 gallon bucket). In some embodiments, the pouring device 100 is used to pour the liquid from the bucket 105 into smaller containers. The pouring device 100 is designed to be lightweight and portable.

The pouring device 100 comprises a generally flat base 110 having a first side edge 111, a second side edge 112, a front edge 113, a back edge 114, a top surface 115, and a bottom surface 116. The base 110 is for supporting a bucket 105. The base 110 may be constructed in various shapes. For example, in some embodiments, the base 110 is generally semi-circle (or a variation thereof) in shape (see FIG. 1). In some embodiments, the base 110 is square in shape. In some embodiments, the base 110 is circular in shape. The base 110 is not limited to the aforementioned shapes.

The base 110 is raised above a ground surface and attached to a support system. The support system first comprises a first support bar 310 having a first end 311 and a second end 312 and a second support bar 320 having a first end 321 and a second end 322. The first support bar 310 and second support bar 320 are generally vertically oriented and parallel to one another. The first side edge 111 of the base 110 is attached to the first support bar 310. The second side edge 112 of the base 110 is attached to the second support bar 320.

In some embodiments, a first bucket support bar 410 is attached to the first support bar 310 and the second support bar 320. The bucket support bar 410 may be curved. The first bucket support bar 410 extends outwardly in a first direction from the first and second support bars. The bucket support bar 410 is generally perpendicular to the first support bar 310 and second support bar 320. The curvature of the first bucket support bar 410 allows for a bucket 105 to be placed atop the base 110 and in some embodiments be cradled by the first bucket support bar 410.

Above the bucket support bar 410 is a carrying handle 150 that extends from the first support bar 310 to the second support bar 310. The carrying handle 150 is generally perpendicular with respect to the first support bar 310 and the second support bar 320. In some embodiments, the carrying handle 150 is generally rounded for providing comfort to a user when carrying the base 110 via the handle 150.

The support system further comprises a first support leg 210 having a first end 211 and a second end 212 and a second support leg 220 having a first end 221 and a second end 222 that are oriented generally vertical and generally parallel to one another. The first support bar 310 is pivotally mounted on the first support leg 210 via a first pivot pin 130. The second support bar 320 is pivotally mounted on a second support leg 220 via a second pivot pin 130. The first support bar 310 can pivot about the first support leg 210 and the second support bar 320 can pivot about the second support leg 220, which in turn causes the base 110 to pivot. The base 110 is designed to pivot in a first direction, for example in the direction of the first bucket support bar 410.

In some embodiments, a pivot handle 350 is attached to the second support bar 320 (or first support bar 310), for example on the first end 321 of the second support bar 320. In some embodiments, the pivot handle 350 extends upwardly (e.g., vertically) from the second support bar 320. In some embodiments, the pivot handle 350 is connected to the second support bar 320 (or first support bar 310) via a pivot handle connecting bar 340. The pivot handle 350 allows a user to easily pivot or tilt the base 110 and support bar about the pivot pins 130.

In some embodiments, a cross brace 530 is attached to the first support leg 210 and second support leg 220, for example near the second end 212 of the first support leg and second end 222 of the second support leg 220. The cross brace 530 helps to provide stability to the support legs.

In some embodiments, a first foot 230 is attached to the second end 212 of the first support leg 210 to stabilize the first support leg 210 in a vertical position. In some embodiments, a second foot 230 is attached to the second end 222 of the second support leg 220 to stabilize the second support leg 220 in a vertical position. In some embodiments, a first leg brace 510 is disposed on the second end 212 of the first support leg 210 and connects to the first foot 230. In some embodiments, a second leg brace 520 is disposed on the second end 222 of the second support leg 220 and connects to the second foot 230. The leg braces also help provide stability for the first leg support 210 and second leg support 220.

In some embodiments, a second bucket support bar 420 extends from the first bucket support bar 410 downwardly to the base 110, for example the front edge 113 of the base 110. The second bucket support bar 420 helps to stabilize the first bucket support bar 410. The first bucket support bar 410 and second bucket support bar 420 will help prevent the bucket 105 from slipping off of the base 110.

A stop plate 550 is attached to the first support bar 310 and/or second support bar 320, opposite the side that the first bucket support bar 410 extends (e.g., the second side). The stop plate 550 functions to prevent the base 110 from pivoting in a second direction. For example, the base 110 can pivot in the direction of the first bucket support bar 410, but the base 110 cannot pivot in the other direction because the stop plate 550 comes in contact with the first leg support 210 and/or second leg support 220, therefore the base 110 is blocked from continuing to move in that direction.

To use the pouring device 100 of the present invention, a user can place a bucket 105 atop the base 110. He/she can tilt the base, 110 by moving the pivot handle 350 downwardly toward the ground in the direction of the front edge 113 of the base 110 (e.g., in the first direction, in the direction of the first bucket support bar 410) (see FIG. 4). As the base 110 tilts, the liquid in the bucket 105 can be poured from the bucket 105.

Without wishing to limit the present invention to any theory or mechanism, it is believed that the pouring device 100 of the present invention is advantageous because the design (e.g., location of pivot pins 130) allows the bucket 105 to be positioned slightly toward the back edge 114 of the base 110 so that the bucket 105 remains upright when not being tilted by a user. The bucket 105 can be slid onto the base 110 via the back edge 114 so that there is no need to lift the bucket 105 first over the pouring device 100. There is not a need for an attachment means (e.g., a clamp) to secure the bucket 105 to the device 100 when the bucket 105 is being tilted via the pouring device 100. The weight of the bucket 105 and bucket contents is centered, requiring very little force to control the amount of liquid being poured from the bucket 105.

The pouring device 100 of the present invention may be constructed from a variety of material. In some embodiments, the pouring device 100 is constructed from a metal (e.g., steel, aluminum), a wood, a plastic, the like, or a combination thereof.

The pouring device 100 of the present invention may be constructed in a variety of sizes. In some embodiments, the pouring device 100 is between about 35 to 45 inches in height as measured from the leg base 230 to the handle 350. In some embodiments, the pouring device 100 is between about 45 to 55 inches in height as measured from the leg base 230 to the handle 350. In some embodiments, the pouring device 100 is more than about 55 inches in height.

As used herein, the term "about" refers to plus or minus 10% of the referenced number. For example, an embodiment wherein the pouring device 100 is about 50 inches in height includes a pouring device 100 that is between 45 an 55 inches in height.

The following the disclosures of the following U.S. patents are incorporated in their entirety by reference herein: U.S. Pat. Application No. 2007/0059151; U.S. Pat. No. 5,755,816; U.S. Pat. No. 2,605,071; U.S. Pat. No. 1,791,005; U.S. Pat. No. 996,658; U.S. Pat. No. 929,325; U.S. Pat. No. 1,705,580; U.S. Pat. No. 5,393,190; U.S. Pat. No. 5,582,503.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A pouring device for pouring from a bucket, said pouring device comprising:
   (a) a generally flat base for supporting the bucket;
   (b) a first support bar and a second support bar oriented generally vertically and parallel to one another; wherein a first side edge of the base is attached to the first support bar and a second side edge of the base is attached to the second support bar, wherein the base is generally perpendicular to each of the support bars;
   (c) a first bucket support bar attached to the first support bar and the second support bar above the base, the bucket support bar curves outwardly from a first side of the first and second support bars;
   (d) a first support leg and a second support leg oriented generally vertically and parallel to one another, wherein the first support bar is pivotally attached to the first support leg via a first pivot pin and the second support bar is pivotally attached to the second support leg via a second pivot pin;
   (e) a first foot attached to a second end of the first support leg and a second foot attached to a second end of the second support leg, the feet are for stabilizing the respective support legs in a vertical position on a ground surface;
   (f) a pivot handle extending upwardly from the second support bar, the pivot handle allows the pivoting of the base and each support bar about the pivot pins;
   (g) a stop plate attached to a second side of the first support bar opposite the first bucket support bar and extending outwardly past the first leg support, wherein the stop plate functions to prevent the base from pivoting in a second direction; and (h) a carrying handle attached to the first support bar and to the second support bar above the first bucket support bar for providing a user a means of carrying the pouring device.

2. The pouring device of claim 1 further comprising a cross brace attached to the first support leg and second support leg near the second end of the first support leg and second end of the second support leg. The cross brace helps to provide stability to the support legs.

3. The pouring device of claim 1 further comprising a second bucket support bar extending the first bucket support bar downwardly to the front edge of the base for helping to stabilize the first bucket support bar.

4. The pouring device of claim 1 further comprising a first leg brace disposed on the second end of the first support leg and connecting to the first foot, wherein the first leg brace helps stabilize the first leg support.

5. The pouring device of claim 1 further comprising a second leg brace disposed on the second end of the second support leg and connecting to the second foot, wherein the second leg brace helps to stabilize the second leg support.

* * * * *